(12) United States Patent
Tabor et al.

(10) Patent No.: US 9,034,231 B2
(45) Date of Patent: May 19, 2015

(54) CUP LID

(75) Inventors: Kyle F. Tabor, Palos Hills, IL (US);
Alexander R Kastelic, Chicago, IL (US)

(73) Assignee: Berry Plastics Corporation, Evansville, IN (US)

( * ) Notice: Subject to any disclaimer, the term of this patent is extended or adjusted under 35 U.S.C. 154(b) by 290 days.

(21) Appl. No.: 13/448,050

(22) Filed: Apr. 16, 2012

(65) Prior Publication Data

US 2012/0261417 A1    Oct. 18, 2012

Related U.S. Application Data

(60) Provisional application No. 61/475,581, filed on Apr. 14, 2011.

(51) Int. Cl.
*B65D 43/06* (2006.01)
*B26F 1/40* (2006.01)
*B65D 1/26* (2006.01)
*B65D 43/02* (2006.01)

(52) U.S. Cl.
CPC . *B26F 1/40* (2013.01); *B65D 1/265* (2013.01); *B65D 43/0212* (2013.01); *B65D 2543/00046* (2013.01); *B65D 2543/00092* (2013.01); *B65D 2543/00296* (2013.01); *B65D 2543/00351* (2013.01); *B65D 2543/00509* (2013.01); *B65D 2543/00537* (2013.01); *B65D 2543/00555* (2013.01); *B65D 2543/00657* (2013.01); *B65D 2543/00685* (2013.01); *B65D 2543/00731* (2013.01); *B65D 2543/00796* (2013.01)

(58) Field of Classification Search
CPC ........... B65D 43/06; B65D 2543/0037; B65D 2543/00851; B29C 2793/0009; B29D 99/0096
See application file for complete search history.

(56) References Cited

U.S. PATENT DOCUMENTS

| | | | | |
|---|---|---|---|---|
| 5,151,233 | A | * | 9/1992 | Wendt ............................. 264/153 |
| 5,839,601 | A | | 11/1998 | Van Melle |
| 5,913,964 | A | * | 6/1999 | Melton ............................. 99/322 |
| 5,947,323 | A | * | 9/1999 | Freek et al. .................... 220/709 |
| 6,886,707 | B2 | | 5/2005 | Giraud |
| 7,055,715 | B2 | | 6/2006 | Maravich et al. |
| 7,175,042 | B2 | | 2/2007 | Durdon |
| 7,318,563 | B2 | | 1/2008 | Houts |
| 8,074,331 | B2 | | 12/2011 | Voges |
| 2004/0178199 | A1 | | 9/2004 | Stroup |
| 2006/0226148 | A1 | | 10/2006 | Hundley et al. |
| 2009/0266829 | A1 | | 10/2009 | Bailey |
| 2009/0308882 | A1 | | 12/2009 | Hundley |
| 2010/0037780 | A1 | | 2/2010 | Pas et al. |

* cited by examiner

*Primary Examiner* — Alison Hindenlang
(74) *Attorney, Agent, or Firm* — Barnes & Thornburg LLP (57) ABSTRACT

A liquid container includes a brim forming a mouth opening into a product receiving chamber formed in a cup. A lid is coupled to the rim to close the mouth of the cup.

17 Claims, 9 Drawing Sheets

CUP LID

PRIORITY CLAIM

This application claims priority under 35 U.S.C. §119(e) to U.S. Provisional Application Ser. No. 61/475,581, filed Apr. 14, 2011, which is expressly incorporated by reference herein.

BACKGROUND

The present disclosure relates to lids, and particularly to lids for drink cups. More particularly, the present disclosure relates to a cup lid that includes a rim that mates with a brim included in a drink cup.

SUMMARY

According to the present disclosure, a container includes a cup and a lid. The lid is adapted to mate with a brim included in a cup to close a top aperture opening into an interior liquid-storage region formed in the cup.

In illustrative embodiments, a method of producing a lid for a cup comprises the steps of providing a non-perforated cover and converting the non-perforated cover into either a first perforated (beverage) lid adapted to receive a straw or a second perforated (dessert) lid adapted to receive a utensil such as a spoon. In illustrative embodiments, the non-perforated cover includes a central closure and a ring-shaped brim mount arranged to surround the central closure and mate to a brim of the cup.

In illustrative embodiments, the non-perforated closure is converted into the first perforated (beverage) lid by severing an inner portion of the central closure to establish a straw receiver and by severing an outer portion of the central closure to establish a closable sip aperture. The straw receiver adapted to receive a straw therein so that consumers can drink liquid stored in a product-receiving chamber formed in the cup through the straw. The sip aperture is covered by a movable sip flap so that consumer can drink liquid stored in the product-receiving chamber and expelled through the sip aperture when the sip flap is moved to an opened position by a consumer.

In illustrative embodiments, the non-perforated closure is converted into the second perforated (dessert) lid by severing a different portion of the central closure along a wide-diameter circular path to cause an elevated basin in the central closure to be separated from a surrounding dome-shaped wall also included in the central closure to cause a wide-diameter utensil-receiving aperture to be formed in the central closure so that a consumer can eat a dessert stored in the cup easily using a spoon without separating the lid from the brim of the cup.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 7-9 are a series of elevation views showing movement of the sip flap from the closed position of FIG. 6 to the opened position of FIG. 9;

DETAILED DESCRIPTION

Figure 9:
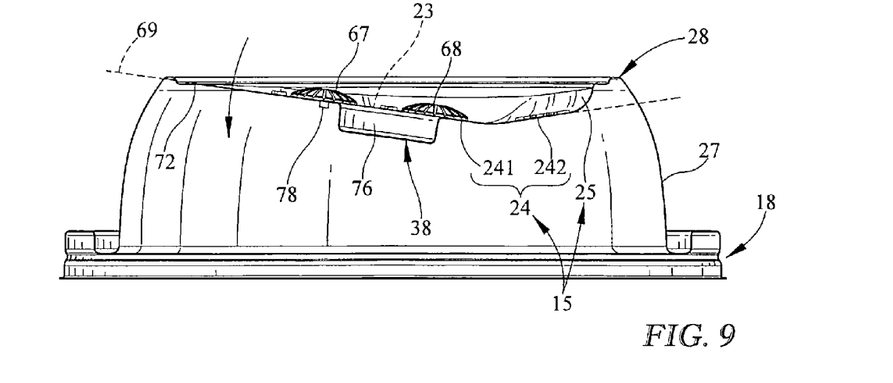
FIG. 9 is a view similar to FIG. 8 showing the sip flap in the opened position and mated with the straw receiver to retain the sip flap in the opened position.
Figure 10:
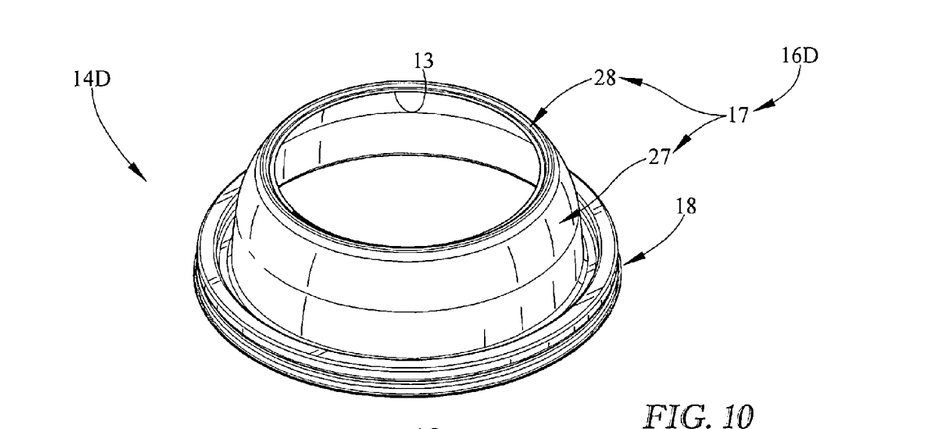
FIG. 10 is a perspective view of the lid of FIG. 1 in the dessert mode showing that the lid includes a rim for coupling the lid to the cup and a product-retaining shell extending upwardly away from the rim and showing that lid is formed to include a utensil-receiving aperture.
Figure 11:
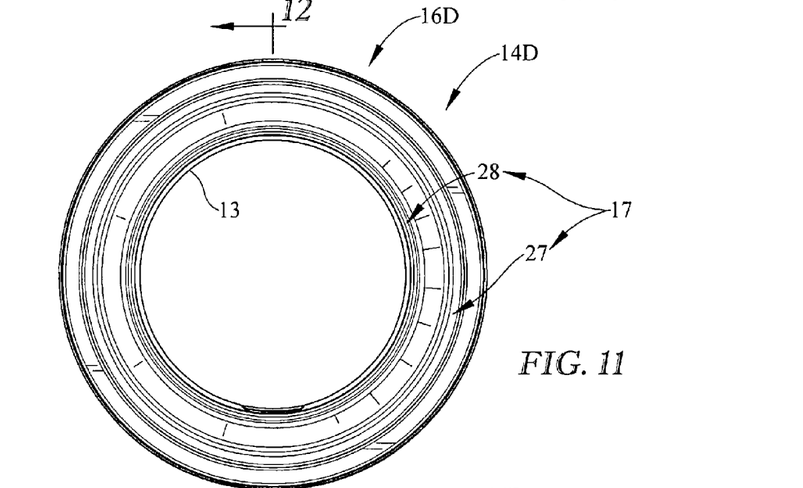
FIG. 11 is a plan view of the lid of FIG. 10 in the dessert mode.
Figure 12:
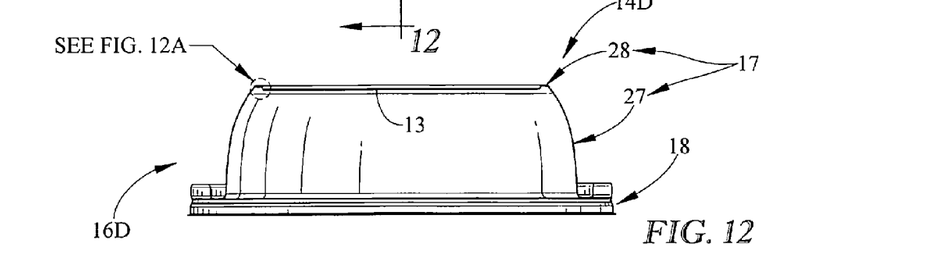
FIG. 12 is a sectional view taken along line 12-12 of FIG. 11.
Figure 13:
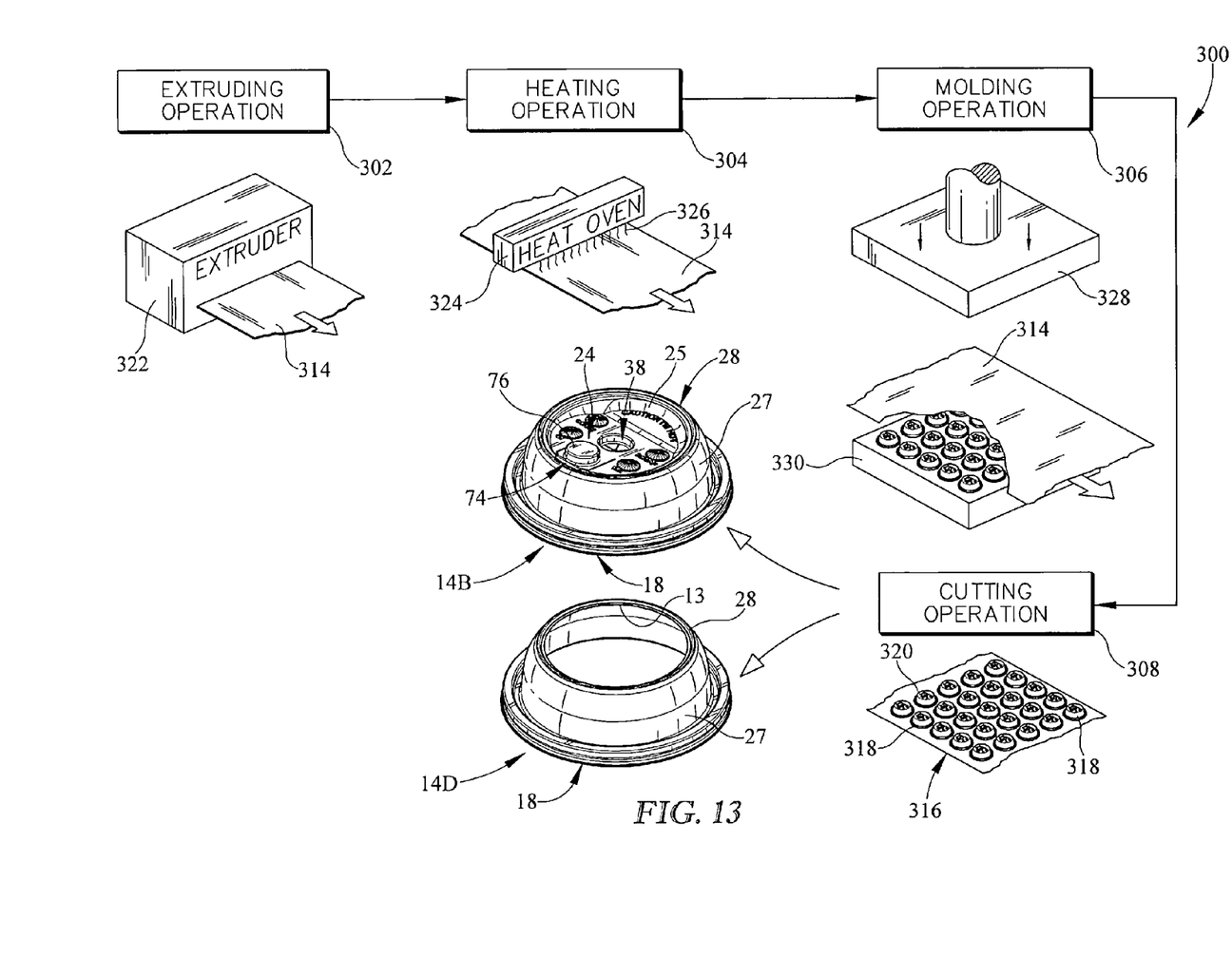
FIG. 13 is a perspective and diagrammatic view of a lid-manufacturing process in accordance with the present disclosure showing that the lid-manufacturing process includes an extruding stage in which a continuous plastics-material sheet is extruded, a heating stage in which the continuous plastics-material sheet is heated, a molding stage in which the heated continuous plastics-material sheet is molded to form a set of non-perforated covers carried by a lid-carrier sheet, and a cutting stage in which the non perforated lids are separated from the lid-carrier sheet and each non-perforated cover is cut to form a lid in the beverage mode or a lid in the dessert mode.
Figure 14:
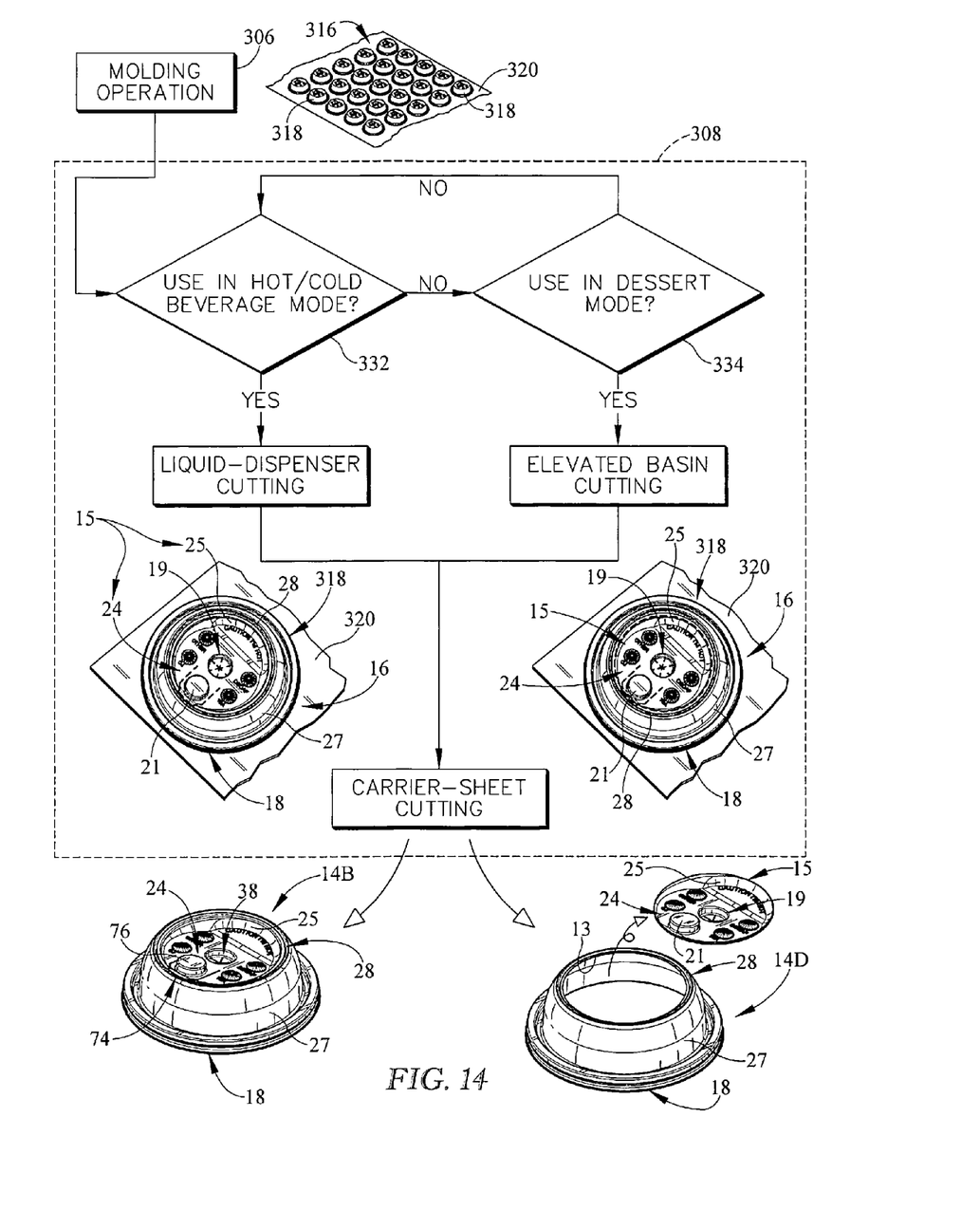
FIG. 14 is a perspective and diagrammatic view of the cutting stage of FIG. 13 showing that the cutting stage includes first and second mode-determination operations that determine whether the non-perforated cover is cut to form a lid in the beverage mode or a lid in the dessert mode, cutting the lid blank according the desired mode, and then separating the lid blank from the lid-carrier sheet to form a series of lids configured in the desired mode.
Figure 15:
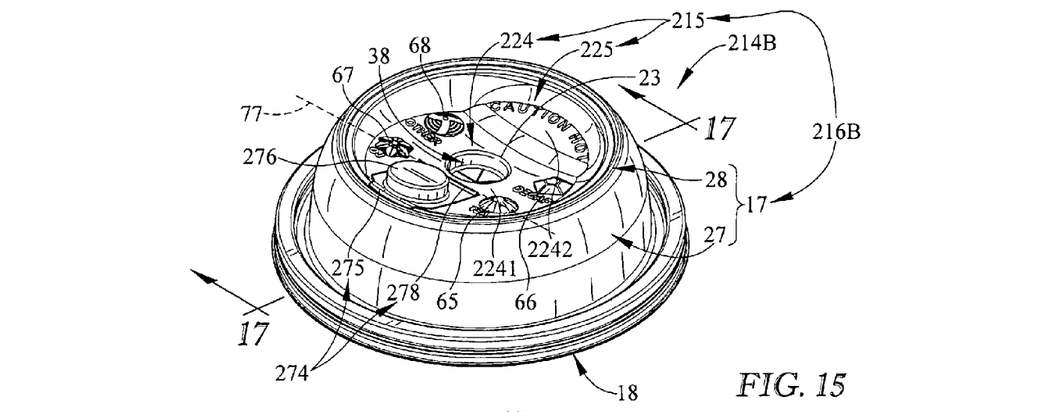
FIG. 15 is a perspective view of a second embodiment of a lid in accordance with the present disclosure showing the lid in the beverage mode.
Figure 16:
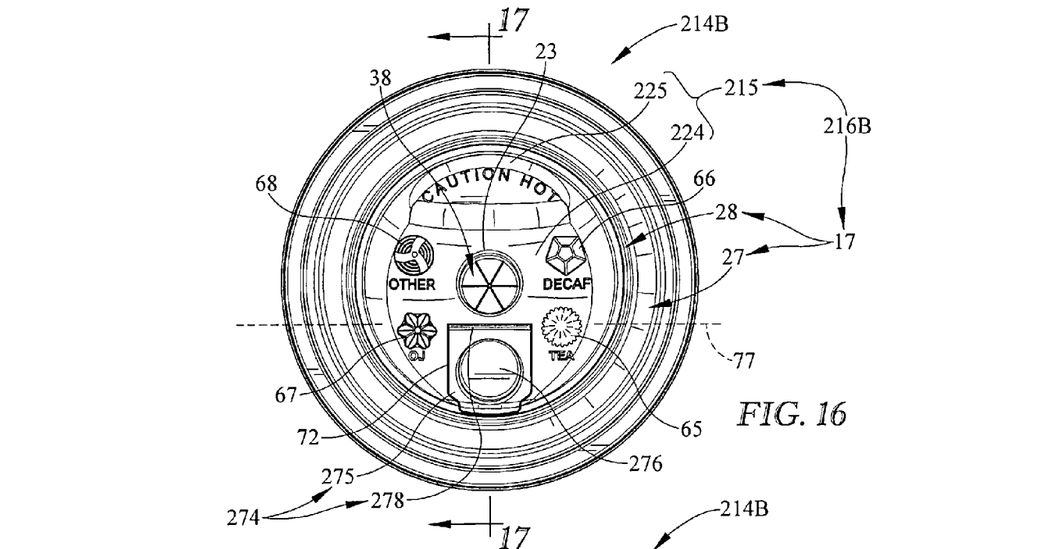
FIG. 16 is plan view of the lid of FIG. 15 in the beverage mode.
Figure 17:
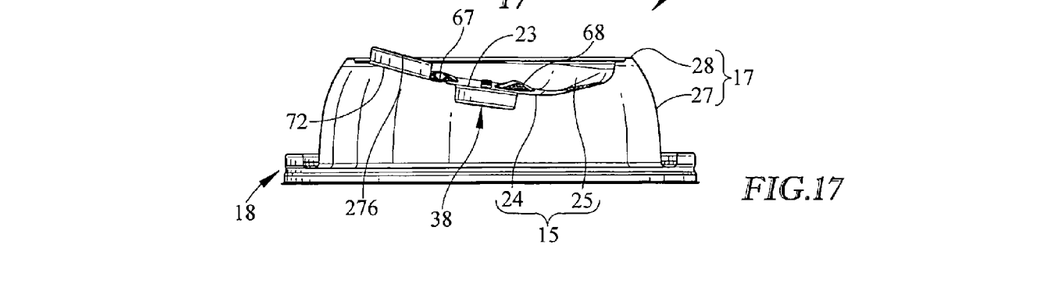
FIG. 17 is a sectional view taken along line 17-17 of FIGS. 15 and 16.

A liquid container includes a cup 12 and a lid configured in either a beverage mode as shown, for example, in FIGS. 1-9 or a dessert mode as shown in FIGS. 10-12. An illustrative lid-manufacturing process 300 is used to form either a lid 14B in the beverage mode or a lid 14D in the dessert mode as shown in FIGS. 13 and 14. As suggested in FIG. 1, lid 14B in the beverage mode is converted to lid 14D in the dessert mode by applying a cutting operation 308 so that a utensil-receiving aperture 13 is established. Another embodiment of a lid 214B in the beverage mode is shown in FIGS. 15-17. Lid 214B may also be process according to lid-manufacturing process 300 to form a lid in dessert mode.

Lid 14B, configured in the beverage mode, includes a central closure 16B and ring-shaped brim mount 18 as shown in FIGS. 1-4. Ring-shaped brim mount 18 is configured to mount on a brim 20 included in cup 12. Central closure 16B is appended to ring-shaped brim mount 18 to extend upwardly away from brim 20 of cup 12 to close a mouth opening into a product-receiving chamber 22 formed in cup 12 as suggested in FIGS. 1 and 5 and shown in FIG. 6.

Lid 14D, configured in the dessert mode, includes a central closure 16D and ring-shaped brim mount 18 as shown in FIGS. 1 and 10-12. Ring-shaped brim mount 18 is the same on both lids 14B and 14D. Central closure 16B of lid 14B may be converted to central closure 16D by cutting operation 308 as suggested in FIG. 14. Cutting operation 308 operates to remove a portion of central closure 16D and form utensil-receiving aperture 13 that opens into product-receiving chamber 22 to receive a utensil, such as a spoon, therein. As a result of ring-shaped brim mount 18 being the same in both beverage mode and dessert mode, either lid 14B or 14D may be coupled to the same cup 12.

A lid-manufacturing process 300 includes the steps of providing a non-perforated cover 318, converting non-perforated cover 318 into a first perforated (beverage) lid 14B when first perforated (beverage) lid 14B is desired, and converting non-perforated cover 318 into a second perforated (dessert) lid 14D when second perforated (dessert) lid 14D is desired. Non-perforated cover 318 may be provided as shown, for example, in FIG. 13. Converting non-perforated cover 318 into first or second perforated lids 14B, 14D may be done as shown, for example, in FIG. 14.

Non-perforated cover 318 includes a central closure 16 and ring-shaped brim mount 18 as shown in FIG. 14. Ring-shaped brim mount 18 is unchanged during conversion of non-perforated cover 318 into first perforated lid 14B or second perforated lid 14D. Central closure 16 includes an elevated basin 15, a product-retaining shell 17, a central well 19, and a nub 21 as shown in FIG. 14. Elevated basin 15 is arranged to lie spaced apart above ring-shaped brim mount 18. Product-retaining shell 17 is coupled to a perimeter of elevated basin 15 to extend away from elevated basin 15 downwardly to couple to ring-shaped brim mount 18. Central well 19 is appended to elevated basin 15 to extend downwardly toward ring-shaped brim mount 18. Nub 21 is appended to elevated basin 15 to extend upwardly away from ring-shaped brim mount 18. Product-retaining shell 17 remains substantially unchanged during conversion of non-perforated cover 318 to lids 14B or 14D.

Non-perforated cover 318 is converted into first perforated (beverage) lid 14B by making a straw-receiver cut in elevated basin 15 and a sip-flap cut in central closure 16. Straw-receiver cut forms a straw receiver 38 that is adapted to receive a straw therein. In another example, the straw-receiver cut is formed in central well 19 converting central well 19 into straw receiver 38. Sip-flap cut forms a sip aperture 72 in central closure 16 and a sip flap 74 from a portion of central closure 16.

Lid 14B includes a central closure 16B and ring-shaped brim mount 18 as shown in FIGS. 1-4. Ring-shaped brim mount 18 is configured to mount on a brim 20 included in cup 12. Central closure 16B is appended to ring-shaped brim mount 18 to extend upwardly away from brim 20 of cup 12 to close the mouth opening into product-receiving chamber 22 formed in cup 12.

Central closure 16B includes elevated basin 15, product-retaining shell 17, straw receiver 38, and straw-receiver closure 76 as shown in FIGS. 1-4. Elevated basin 15 is arranged to lie spaced apart above ring-shaped brim mount 18. Product-retaining shell 17 is coupled to a perimeter of elevated basin 15 to extend away from elevated basin 15 downwardly to couple to ring-shaped brim mount 18. Straw receiver 38 is appended to elevated basin 15 to extend downwardly toward ring-shaped brim mount 18. Straw-receiver closure 76 is appended to elevated basin 15 to extend upwardly away from ring-shaped brim mount 18. Product-retaining shell 17 remains substantially unchanged during conversion of non-perforated cover 318 to lid 14B or lid 14D.

Figures 7, 8:
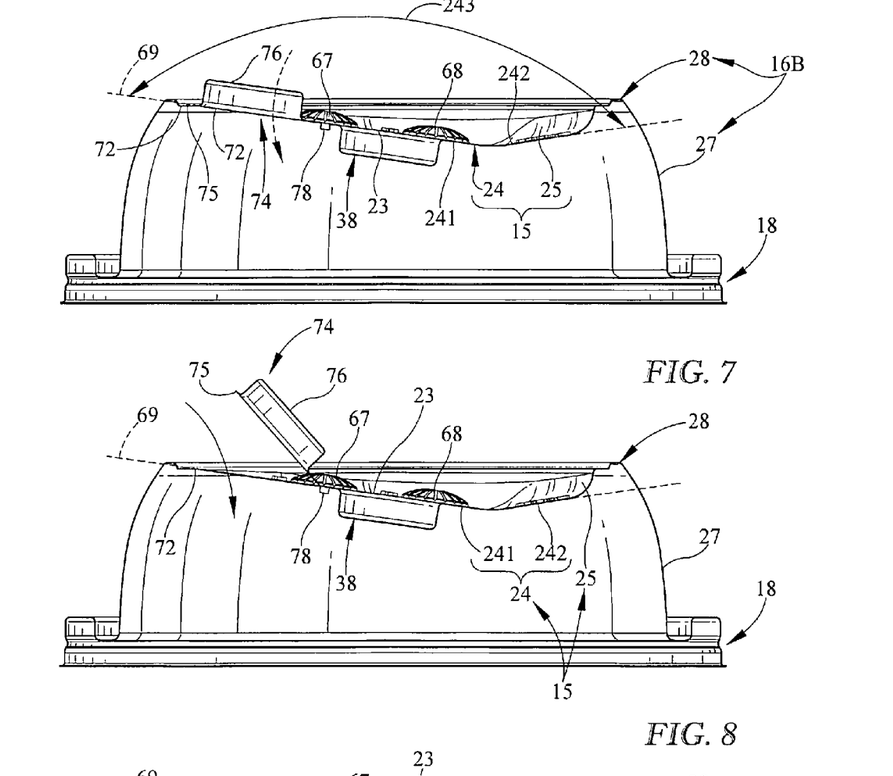
FIG. 7 is a sectional view taken along line 4-4 of FIGS. 2 and 3 showing the sip flap in the closed position.
FIG. 8 is a view similar to FIG. 7 showing the sip flap positioned to lie about midway between the closed position of FIGS. 2, 3, and 7 and the opened position as suggested in FIG. 9.

Elevated basin 15 includes a raised floor 24 and a curved liquid-retaining wall 25 as shown in FIGS. 7-9. Raised floor 24 is coupled to product-retaining shell 17. Curved liquid-retaining wall 25 is coupled to raised floor 24 to extend between and interconnect raised floor 24 to product-retaining shell 17.

Figure 4:
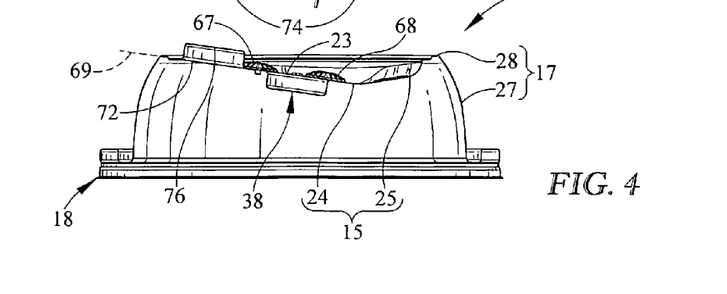
FIG. 4 is a sectional view taken along line 4-4 of FIGS. 2 and 3.

Raised floor 24 includes a first floor panel 241 and a second floor panel 242 as shown in FIGS. 7-9. First floor panel 241 is coupled to product-retaining shell 17 to extend downwardly toward ring-shaped brim mount 18. Second floor panel 242 is coupled to first floor panel 241 to extend upwardly away from first floor panel 241 toward curved liquid-retaining wall 25 as shown in FIG. 4.

Figure 2:
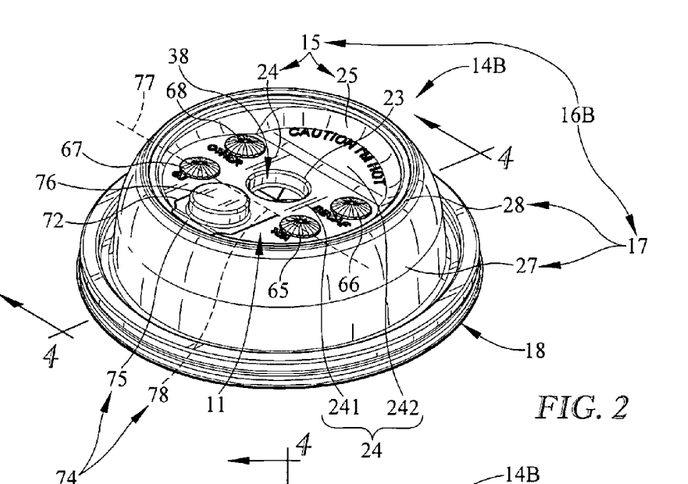
FIG. 2 is a perspective view of the lid of FIG. 1 in the beverage mode showing that the lid includes a straw receiver in a center portion of the lid, a sip flap in a closed position closing a sip aperture formed in an outer portion of the lid, and four deformable product-identification domes spaced around the straw receiver.
Figure 3:
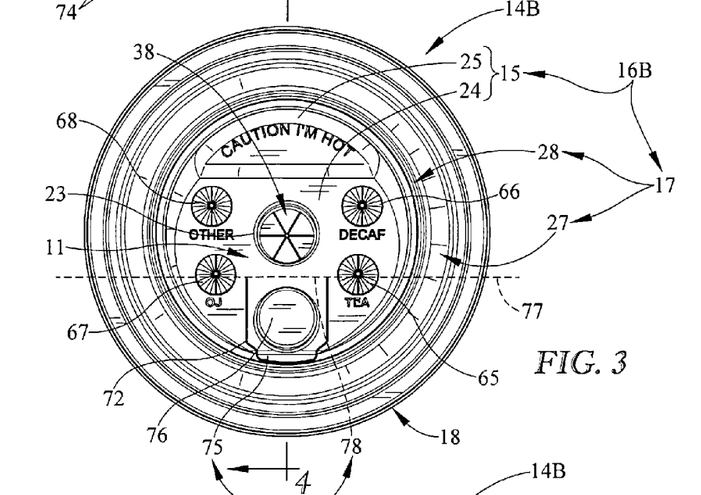
FIG. 3 is a plan view of the lid of FIGS. 1 and 2 in the beverage mode.

During cutting operation 308, a sip flap 74 is formed in central closure 16B. Sip flap 74 includes, for example, a sip-flap tab 75 and a sip-flap hinge 78 as shown in FIGS. 2-4. Sip-flap hinge 78 interconnects sip-flap tab 75 to elevated basin 15 so that sip-flap tab 75 is movable between a closed position shown in FIG. 7 and an opened position shown in FIG. 9. Sip-flap tab 75 when in the closed position lies in and closes first aperture 23 opening into straw receiver 38. Sip-flap tab 75 pivots about a tab axis 77 from the opened position to the closed position to lie in spaced-apart relation to sip aperture 72. Sip-flap hinge 78 extends downwardly toward ring-shaped brim mount 18 as shown in FIGS. 7-9.

Non-perforated cover 318 may also be converted into second perforated (dessert) lid 14D by making a utensil-receiver cut in central closure 16 to separate elevated basin 15 from product-retaining shell 17. As a result, utensil-receiving aperture 13 is formed in central closure 16 that is adapted to receive a utensil such as a spoon therein.

In one example, in accordance with the present disclosure, the straw-receiver cut is made before the sip-flap cut. In another example, the sip-flap cut is made before the straw-receiver cut. In still yet another example, the sip-flap cut and the straw-receiver cut are made at about the same time.

Lid-manufacturing process 300 provides lid 14B in beverage mode or a lid 14D in dessert mode as desired by a user. Lid-manufacturing process 300 includes a series of operations used to make either lid 14B or 14D as shown in FIGS. 13 and 14. Lid-manufacturing process 300 includes an extrusion operation 302, a heating operation 304, a molding operation 306, and a cutting operation 308 as shown in FIG. 13. Extruding operation 302 extrudes a continuous plastics material sheet 314. Heating operation 304 heats plastics-material sheet 314. Molding operation 306 molds continuous plastics-material sheet 314 into a continuous molded sheet 316 that includes a set of non-perforated covers 318 and a lid-carrier sheet 320. Cutting operation 308 cuts non-perforated covers 318 from lid-carrier sheet 320 and provides cuts to each non-perforated cover 318 to form either lid 14B in beverage mode or lid 14D in dessert mode.

Extrusion operation 302 extrudes continuous plastics-material sheet 314 that is either passed on to heating operation 304 or accumulated and stored for use at a later time in heating operation 304 as shown in FIG. 13. Extrusion operation 302 is accomplished by extruding continuous plastics-material sheet 314. As an example, plastics material is polypropylene, but may be any other suitable plastics material. An extruder machine 322 is supplied with raw plastics pellets which are heated and processed by extruder machine 322. As an example, continuous plastics-material sheet 314 is formed at a given rate and sufficient thickness to support downstream processes such as heating operation 304 and molding operation 306. In another example, extrusion operation 302 may be omitted and plastics-material sheet 314 may be purchased.

Heating operation 304 is accomplished illustratively by passing continuous plastics-material sheet 314 under a heater 324 as shown in FIG. 13. Heater 324 applies heat 326 to continuous plastics-material sheet 314 to cause continuous plastics material sheet 314 to be heated to a temperature appropriate for molding in molding operation 306.

Molding operation 306 is accomplished by positioning a portion of continuous plastics-material sheet 314 in a mold cavity formed between an upper female mold core 328 and a lower male mold core 330 as shown in FIG. 13. During molding operation 306, cores 328, 330 move toward one another to form continuous molded sheet 316. Continuous molded sheet 316 includes a set of individual non-perforated covers 318 and lid-carrier sheet 320 coupled to non-perforated covers 318. After molding operation 306 is complete, mold cores 328, 330 move apart from one another and continuous molded sheet 316 moves to cutting operation 308.

Cutting operation 308 is performed by moving continuous molded sheet 316 past a stamping machine that includes, for example, either a first or a second stamping die. When lid 14B in beverage mode is desired, first stamping die may be used. When lid 14D in dessert mode is desired, second stamping die may be used. First stamping die may be used to separate non-perforated cover 318 from lid-carrier sheet 320 and form lid 14B that includes a straw receiver 38 and sip flap 74. Second stamping die may be used to separate non-perforated covers 318 from lid-carrier sheet 320 and form utensil-receiving aperture 13. While a stamping operation is discussed, any other suitable methods of cutting may be used.

After cutting operation 308 is complete, an accumulating operation may be performed in which individual lids are nested in one another so that a lid stack is established. As an example, lids are nested in one another by the stamping machine. After each lid stack includes a sufficient number of lids, the lid stack is packaged for transport or storage.

As shown in FIG. 14, determination of which stamping die to be used in cutting operation 308 is determined by a first decision 332 and a second decision 334. First decision 332 asks whether the lid will be used in a hot/cold beverage mode. If the answer is yes, then the first stamping die is used and lid 14B is produced. If the answer is no, then second decision 334 asks whether the lid will be used in a dessert mode. If the answer is yes, then the second stamping die is used and lid 14D is produced by cutting out elevated basin 15 from central closure 16. If the answer is no, then first decision 332 is asked again. If dessert mode is desired, elevated basin 15 is removed and recycled along with lid-carrier sheet 320. The lid in either beverage mode or dessert may be coupled to the same cup 12 as suggested in FIG. 1.

Figure 1:
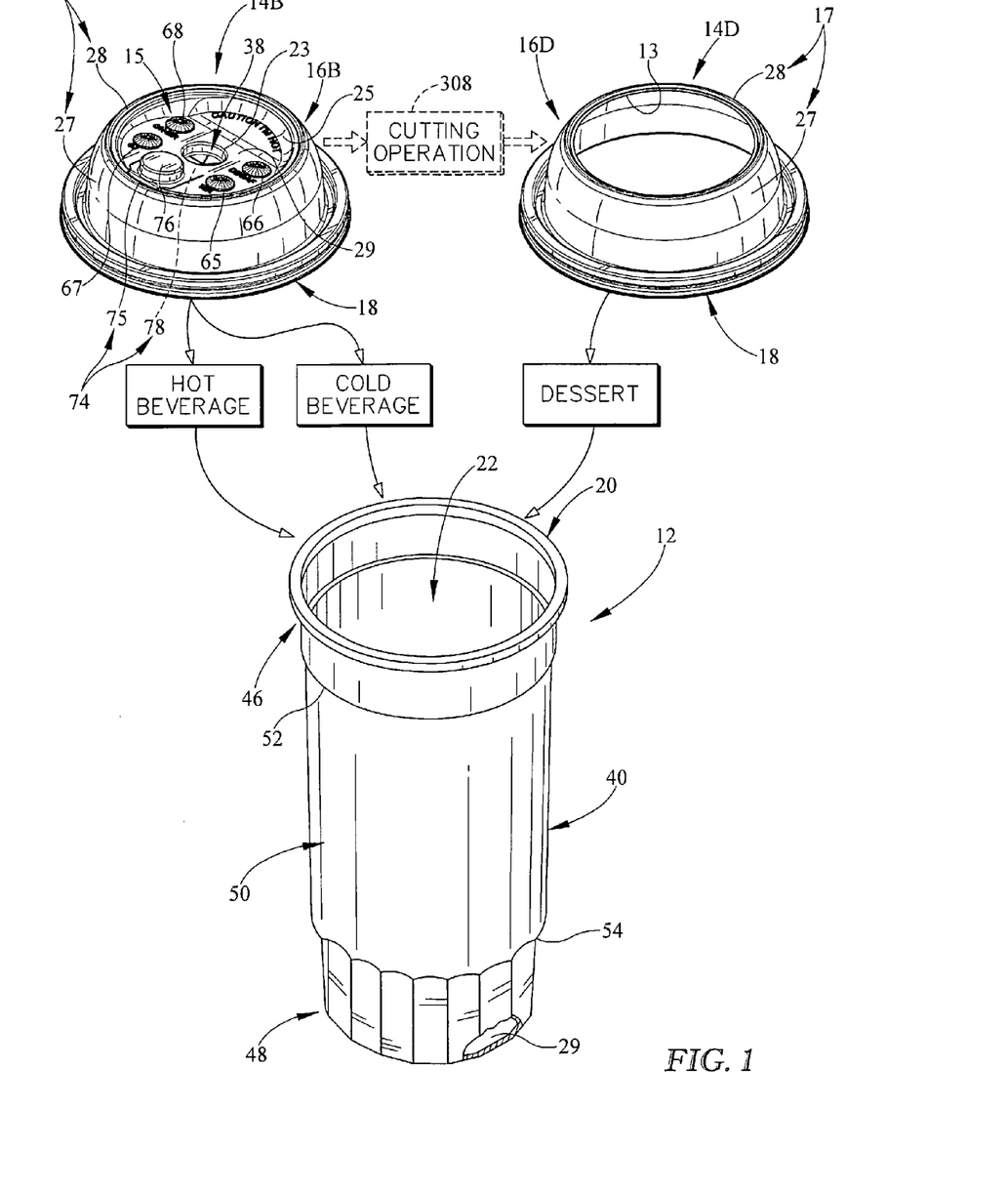
FIG. 1 is a perspective view and diagrammatic view of a lid in accordance with the present disclosure showing that the lid may be configured for use in a beverage mode for hot or cold beverages using a first severing step to produce straw-receiving and sipping capabilities or configured via an alternative severing step for use in a dessert mode and showing that the lid in either the beverage mode or dessert mode may be mounted on the same cup.

Cup 12 includes brim 20, a floor 29, and a side wall 40 extending from brim 20 to floor 29 as shown in FIG. 1. Side wall 40 is formed to include a large-diameter top portion 46 appended to brim 20, a small-diameter bottom portion 48, and a body portion 50 located between top and bottom portions 46, 48 as shown in FIG. 1. Side wall 40 also includes an annular top transitional portion 52 interconnecting top portion 46 and body portion 50. Side wall 40 also includes a scalloped annular bottom transitional portion 54 interconnecting body portion 50 and bottom portion 48 as suggested in FIG. 1.

Figures 5, 6:
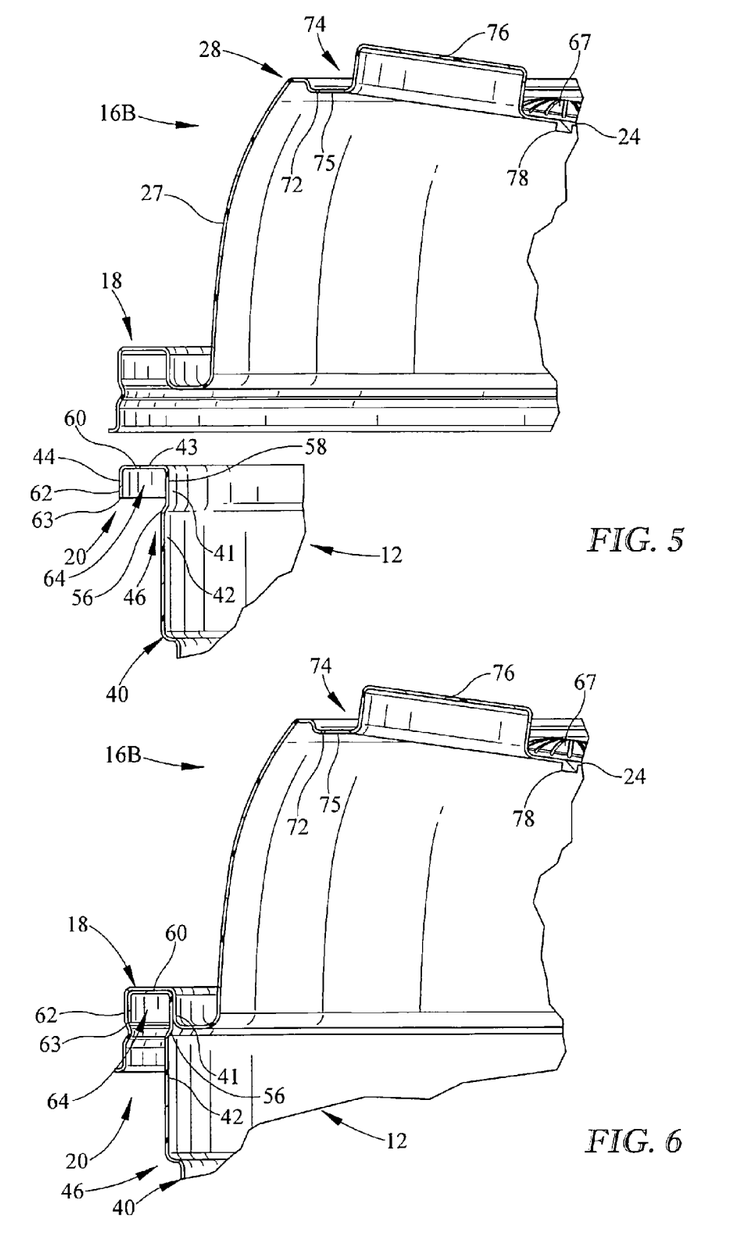
FIG. 5 is an enlarged partial elevation view of the lid and cup of FIG. 1 with portions broken away to suggest the interaction between a rim included in the lid and a brim included in the cup.
FIG. 6 is a view similar to FIG. 5 after the rim of the lid has engaged the brim of the cup.

As shown, for example, in FIGS. 4 and 5, brim 20 includes, in series, a lid retainer 56, an inner annular strip 58, an annular bridge 60, and an outer annular strip 62. Lid retainer 56 is rooted to an upper portion of top portion 46 to anchor brim 20 to top portion 46. Outer annular strip 62 is oriented to lie in concentric relation to inner annular strip 58 and annular bridge 60 extends horizontally to link inner and outer annular strips 58, 62 as suggested in FIG. 5. Strips 58, 62 and bridge 60 cooperate to form a downwardly opening annular channel 64 above an exterior surface of lid retainer 56 in the illustrated embodiment. Outer annular strip 62 includes an axially downwardly facing annular terminal end 63.

Brim 20 is configured to form several seal surfaces arranged to mate with companion portions of lid 14B, 14D as suggested, for example, in FIGS. 4 and 5. Large-diameter top portion 46 includes radially inwardly facing first annular seal surface 41. Inner annular strip 58 includes second radially inwardly facing second annular seal surface 42. Annular bridge 60 includes axially upwardly facing third annular seal surface 43. Outer annular strip 62 includes radially outwardly facing fourth annular seal surface 44.

Ring-shaped brim mount 18 interconnects central closure 16B, 16D to brim 20 of cup 12 as suggested in FIGS. 1, 5, and 6. Central closure 16 further includes a series of deformable product-identification domes 65, 66, 67, 68. As shown in FIGS. 2-4, the series of deformable product-identification domes 65, 66, 67, 68 are formed in elevated basin 15 and are arranged to extend upwardly away from ring-shaped brim mount 18. As shown in FIG. 3, each one of the series of deformable product-identification domes 65, 66, 67, 68 is spaced apart from every other one of the series of deformable product-identification domes 65, 66, 67, 68 and is spaced apart from straw receiver 38. In use, a user may apply a force to one or more of the series of deformable product-identification domes 65, 66, 67, 68 causing one or more of the series of deformable product-identification domes 65, 66, 67, 68 to deform and extend downwardly toward ring-shaped brim mount 18.

Central closure 16 includes central well 19 that is converted into straw receiver 38. Central well 19 is appended to elevated basin 15 to extend downwardly toward ring-shaped brim mount 18. A first aperture 23 is formed in elevated basin 15 that opens into and is defined by central well 19. After conversion, first aperture 23 opens into and is defined by straw receiver 38. As shown in FIG. 8, first aperture 23 and sip aperture 72 are formed in a common plane 69 defined by a portion of the elevated basin 15.

Central closure 16 also includes nub 21 that is converted into a straw-receiver closure 76 as a result of making sip-flap cut. As shown in FIGS. 2-4, straw-receiver closure 76 is appended to sip flap 74 to move therewith. Straw-receiver closure 76 is arranged to extend through first aperture 23 of elevated basin 15 to mate with straw receiver 38 to cause straw receiver 38 to be sealed when sip-flap tab 75 is in the closed position as shown in FIG. 9. Straw-receiver closure 76 and straw receiver 38 are both sized to cause sip-flap tab 75 to be retained in the closed position.

Elevated basin 15 includes a raised floor 24 and a curved liquid-retaining wall 25 as shown in FIGS. 2 and 3. Raised floor 24 is coupled to product-retaining shell 17. Curved liquid-retaining wall 25 is coupled to raised floor 24 to extend between and interconnect raised floor 24 to product-retaining shell 17.

Raised floor 24 includes a first floor panel 241 and a second floor panel 242 as shown in FIGS. 2-4. First floor panel 241 is coupled to product-retaining shell 17 to extend downwardly toward ring-shaped brim mount 18. Second floor panel 242 is coupled to first floor panel 241 to extend upwardly away from first floor panel 241 toward curved liquid-retaining wall 25 so as to define an obtuse angle 243 therebetween as shown in FIG. 7.

Product-retaining shell 17 includes a curved product-retaining wall 27 and a top wall 28 as shown in FIG. 2-6. Curved product-retaining wall 27 is coupled to ring-shaped brim mount 18 to extend upwardly away from brim 20 of cup 12. Top wall 28 extends between and interconnects curved product-retaining wall 27 and elevated basin 15.

Figure 12A:
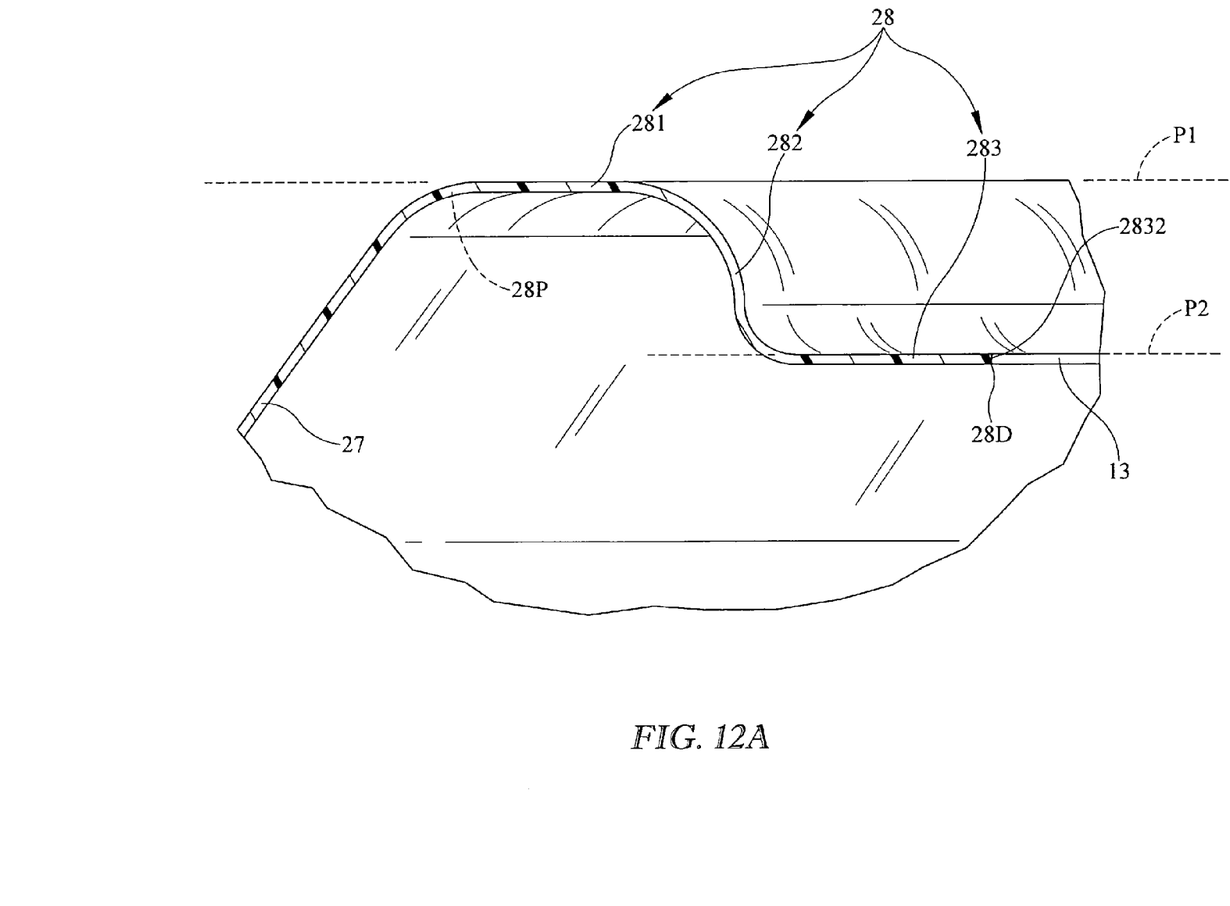
FIG. 12A is an enlarged partial elevation view of the lid of FIG. 12 showing a top wall included in the product-retaining shell.

Top wall 28 includes a proximal end 28P and a distal end 28D spaced apart from proximal end 28P as shown in FIG. 12A. Proximal end 28P is coupled to curved product-retaining wall 27. Distal end 28D is coupled to elevated basin 15 and defines utensil-receiving aperture 13 when the utensil-receiver cut is made.

Top wall 28 further includes an upper ring 281, a lower lip 283 spaced apart below upper ring 281, and a medial band 282 as shown in FIG. 12A. Upper ring 281 is coupled to curved product-retaining wall 27. Lower lip 283 is coupled to elevated basin 15. Medial band 282 extends between and interconnects upper ring 281 and lower lip 283 as shown in FIG. 12A. Lower lip 283 includes a first lip end 2831 and a second lip end 2832. First lip end 2831 is coupled to medial band 282 and second lip end 2832 is spaced apart from first lip end 2831. Second lip end 2832 is distal end 28D of top wall 28.

As shown in FIG. 12A, upper ring 281 lies in a first generally horizontal plane P1. Lower lip 283 lies in a second generally horizontal plane P2. First and second generally horizontal planes P1, P2 are spaced apart from one another and generally parallel to one another as shown, for example, in FIG. 12A.

An illustrative method of producing a lid for a cup comprises the steps of providing non-perforated cover 318 and converting non-perforated cover 318 into a selected one of first perforated lid 14B and second perforated lid 14D. First perforated lid 14B is formed by severing a first portion of central closure 16 to establish straw receiver 38 that forms a straw-receiving aperture in elevated basin 15 when a straw is inserted into straw receiver 38. Second perforated lid 14D is formed by severing a second portion of central closure 16 to cause elevated basin 15 to be separated from curved product-retaining wall 27 so that utensil-receiving aperture 13 is formed in central closure 16 as suggested in FIG. 14.

Lid 14B for a cup 12 comprises ring-shaped brim mount 18, central closure 16, and a product dispenser 11 as shown in FIG. 1. Ring-shaped brim mount 18 is adapted to couple to brim 20 of cup 12. Central closure 16 includes elevated basin 15 that is arranged to lie above and in spaced-apart relation to ring-shaped brim mount 18.

Elevated basin 15 includes raised floor 24, curved liquid-retaining wall 25, and a product-retaining shell 17 as shown in FIGS. 1 and 2. Product-retaining shell 17 is coupled to a perimeter of curved liquid-retaining wall 25 and raised floor 24. Product-retaining shell 17 is arranged to extend downwardly toward ring-shaped brim mount 18 to couple to ring-shaped brim mount 18.

Product dispenser 11 includes straw receiver 38 and a sip-flap tab 75. Straw receiver 38 is coupled to raised floor 24 to extend downwardly away from raised floor 24 toward ring-shaped brim mount 18. Straw receiver 38 is adapted to receive a straw therein. Sip-flap tab 75 is coupled to raised floor 24 to move between the closed position in which sip-flap tab 75 lies in and closes sip aperture 72 formed in raised floor 24 and the opened position in which a portion of sip-flap tab 75 mates with and closes straw receiver 38.

Raised floor 24 is formed to include first aperture 23 defined by straw receiver 38. A portion of the sip-flap tab 75 extends through first aperture 23 to mate with straw receiver 38. First aperture 23 and the sip aperture 72 lie in common plane 69 extending through a portion of raised floor 24.

Lids 14B, 14D minimize the different types of lid inventory that is kept for cups of similar diameters. The lid is configured to fit hot, cold, and desert cup types. Cup 12 may be made of expanded polystyrene foam, plastics materials, paper or any other suitable alternative. Lids 14B, 14D are configured to simplify internal tooling changeover by only changing trim tools, also called stamping dies to produce either lid 14B or 14D. Lids 14B, 14D could be made of plastics material (clear, opaque, or colored) which may be thermoformed. Lids 14D may be a one-piece item which would have the geometry to have elevated basin 15 cut out to allow for access to deserts with a spoon. Lid 14B would be produced with straw receiver 38 and sip flap 74.

Lid 14B may be used for sipping or drinking through a straw regardless of the product included in the container. Cuts made in straw receiver 38 may be used to vent steam emitted from a hot beverage.

Another embodiment of a lid 214B in accordance with the present disclosure is shown, for example, in FIGS. 15-17. Lid 214B is configured in the beverage mode. However, lid 214B may be reconfigured by applying cutting operation 308 to be in the dessert mode. Applying cutting operation 308 to lid 216B converts lid 214B into lid 14D.

Lid 214B includes a central closure 216B and ring-shaped brim mount 18 as shown in FIGS. 15-17. Ring-shaped brim mount 18 is configured to mount on a brim 20 included in cup 12. Central closure 216B is appended to ring-shaped brim mount 18 to extend upwardly away from brim 20 of cup 12 to close a mouth opening into a product-receiving chamber 22 formed in cup 12.

Central closure 216B includes an elevated basin 215, product-retaining shell 17, straw receiver 38, and straw-receiver closure 276 as shown in FIGS. 15-17. Elevated basin 215 is arranged to lie spaced apart above ring-shaped brim mount 18. Product-retaining shell 17 is coupled to a perimeter of elevated basin 215 to extend away from elevated basin 215 downwardly to couple to ring-shaped brim mount 18. Straw receiver 38 is appended to elevated basin 215 to extend downwardly toward ring-shaped brim mount 18. Straw-receiver closure 276 is appended to elevated basin 215 to extend upwardly away from ring-shaped brim mount 18. Product-retaining shell 17 remains substantially unchanged during conversion of non-perforated cover 318 to lid 214B.

Elevated basin 215 includes a raised floor 224 and a curved liquid-retaining wall 225 as shown in FIGS. 15-17. Raised floor 224 is coupled to product-retaining shell 17. Curved liquid-retaining wall 225 is coupled to raised floor 224 to extend between and interconnect raised floor 224 to product-retaining shell 17.

Raised floor 224 includes a first floor panel 2241 and a second floor panel 2242 as shown in FIGS. 15-17. First floor panel 2241 is coupled to product-retaining shell 17 to extend downwardly toward ring-shaped brim mount 18. Second floor panel 2242 is coupled to first floor panel 2241 to extend upwardly away from first floor panel 2241 toward curved liquid-retaining wall 225 as shown in FIG. 17.

During cutting operation 308, a sip flap 274 is formed in central closure 216B. Sip flap 274 includes, for example, a sip-flap tab 275 and a sip-flap hinge 278 as shown in FIGS. 15-17. Sip-flap hinge 278 interconnects sip-flap tab 275 to elevated basin 215 so that sip-flap tab 275 is movable between a closed position shown in FIG. 17 and an opened position. Sip-flap tab 275 when in the closed position lies in and closes first aperture 23 opening into straw receiver 38. Sip-flap tab 275 pivots about a tab axis 77 from the opened position to the closed position to lie in spaced-apart relation to sip aperture 72. Sip-flap hinge 278 extends upwardly away from ring-shaped brim mount 18 as shown in FIGS. 15 and 17. In comparison, sip-flap hinge 78 extends downwardly toward ring-shaped brim mount 18.

The invention claimed is:

1. A method of producing a lid for a cup, the method comprising the steps of
   providing a non-perforated cover including a central closure and a ring-shaped brim mount arranged to surround the central closure, the ring-shaped brim mount being adapted to couple the non-perforated cover to a brim included in a cup, and the central closure including an elevated basin arranged to lie in spaced-apart relation above the ring-shaped brim mount and a product-retaining shell coupled to a perimeter of the elevated basin and arranged to extend downwardly away from the elevated basin to couple to the ring-shaped brim mount, and
   converting the non-perforated cover into a perforated lid by making a utensil-receiver cut in the central closure to separate the elevated basin from the product-retaining shell to cause a utensil-receiving aperture to be formed in the central closure that is adapted to receive a utensil therethrough.

2. The method of claim 1, wherein the product-retaining shell includes a curved product-retaining wall coupled to the ring-shaped brim mount to extend upwardly away from the ring-shaped brim mount and a top wall extending between and interconnecting the curved product-retaining wall and the elevated basin.

3. The method of claim 2, wherein the top wall includes a proximal end coupled to the curved product-retaining wall and a distal end coupled to the elevated basin and the distal end of the top wall defines the utensil-receiving aperture when the utensil-receiver cut is made.

4. The method of claim 3, wherein the top wall includes an upper ring coupled to the curved product-retaining wall, a lower lip coupled to the elevated basin to lie in space-apart relation to the upper ring, and a medial band extending between and interconnecting the upper ring and the lower lip.

5. The method of claim 3, wherein the top wall includes an upper ring coupled to the curved product-retaining wall, a lower lip coupled to the elevated basin to lie in space-apart relation to the upper ring between the upper ring and the elevated basin, and a medial band extending between and interconnecting the upper ring and the lower lip.

6. The method of claim 5, wherein the lower lip includes a first lip end coupled to the medial band and a second lip end spaced apart from the first lip end and the second lip end is the distal end of the top wall.

7. The method of claim 5, wherein the upper ring lies in a first generally horizontal plane, the lower lip lies in a second generally horizontal plane, and the first and second generally horizontal planes are spaced apart from one another and generally parallel to one another.

8. The method of claim 1, wherein the central closure further includes a central well appended to the elevated basin and arranged to extend away from the elevated basin toward the ring-shaped brim mount.

9. The method of claim 8, wherein the central closure further includes a nub appended to the elevated basin to extend upwardly away from the ring-shaped brim mount.

10. A method of producing a lid for a cup, the method comprising the steps of
    providing a non-perforated cover including a central closure and a ring-shaped brim mount arranged to surround the central closure, the central closure including an elevated basin spaced above the ring-shaped brim mount and a curved product-retaining wall coupled to a perimeter of the elevated basin and arranged to extend downwardly to interconnect the ring-shaped brim mount and the elevated basin and
    converting the non-perforated cover into a perforated lid by severing a portion of the central closure to cause the elevated basin to be separated from the curved product-retaining wall so that a utensil-receiving aperture is formed in the central closure.

11. The method of claim 10, wherein the central closure further includes a nub appended to the elevated basin to extend upwardly away from the ring-shaped brim mount.

12. A method of producing a lid for a cup, the method comprising the steps of providing a non-perforated cover including a central closure and a ring-shaped brim mount arranged to surround the central closure, the central closure including an elevated basin arranged to lie in spaced-apart relation above the ring-shaped brim mount, a product-retaining shell coupled to a perimeter of the elevated basin and arranged to extend downwardly away from the elevated basin to couple to the ring-shaped brim mount, a central well appended to the elevated basin and arranged to extend away from the elevated basin toward the ring-shaped brim mount, and converting the non-perforated cover into a first perforated lid by making a utensil-receiver cut in the central closure to separate the elevated basin and central well from the product-retaining shell to cause a utensil-receiving aperture to be formed in the central closure.

13. The method of claim 12, wherein the central closure further includes a nub appended to the elevated basin to extend upwardly away from the ring-shaped brim mount.

14. The method of claim 12, wherein the central closure further includes a series of deformable product-identification domes formed in the elevated basin and arranged to extend upwardly away from the ring-shaped brim mount until a user applies a force to one of the series of deformable product-identification domes causing the one of the series of deformable product-identification domes to deform and extend downwardly toward the ring-shaped brim mount.

15. The method of claim 14, wherein each one of the series of deformable product-identification domes is spaced apart from every other one of the series of deformable product-identification domes and spaced apart from a straw receiver.

16. The method of claim 12, wherein the elevated basin is formed to include a first aperture that is defined by the central well.

17. A method of producing a lid for a cup, the method comprising the steps of providing a first perforated lid including a central closure and a ring-shaped brim mount arranged to surround the central closure, the central closure including an elevated basin arranged to lie in spaced-apart relation above the ring-shaped brim mount, a product-retaining shell coupled to a perimeter of the elevated basin and arranged to extend downwardly away from the elevated basin to couple to the ring-shaped brim mount, a straw receiver appended to the elevated basin and arranged to extend away from the elevated basin toward the ring-shaped brim mount and converting the first perforated lid by making a utensil-receiver cut in the central closure to separate the elevated basin and straw receiver from the product-retaining shell to cause a utensil receiving aperture to be formed in the central closure.

\* \* \* \* \*